Nov. 17, 1970  W. T. GEYER ET AL  3,540,115
METHOD OF MAKING A TANK STRUCTURE
Filed Jan. 29, 1969  5 Sheets-Sheet 1
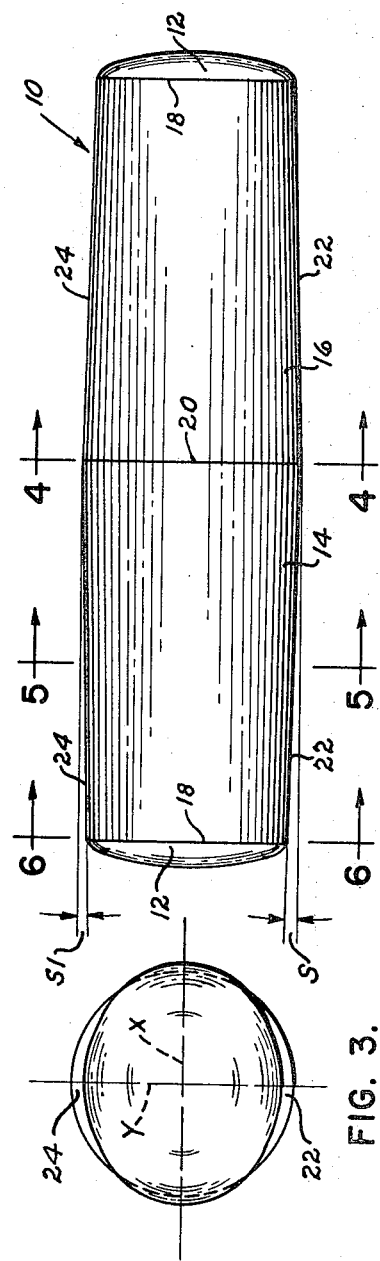
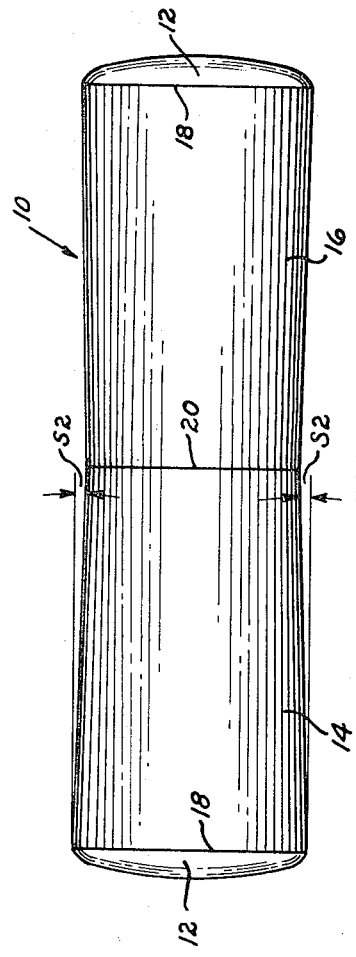
INVENTORS.
WALLACE T. GEYER
ROBERT W. RANDOLPH
BY *Eugene N. Riddle*
ATTORNEY

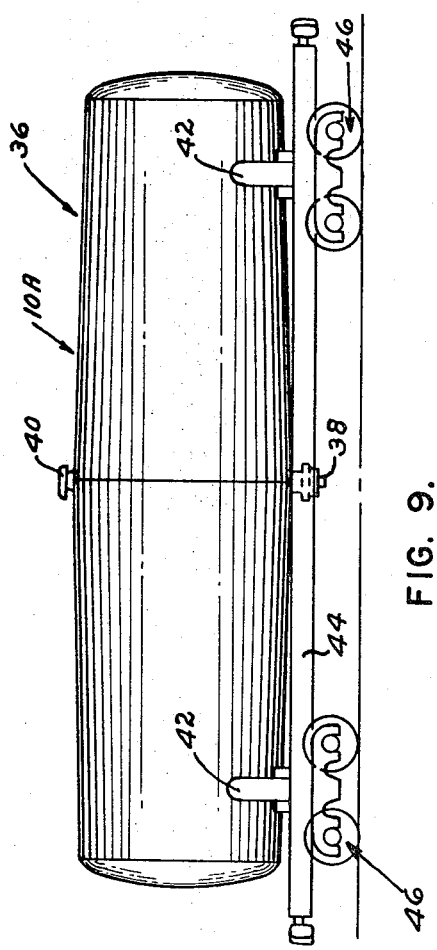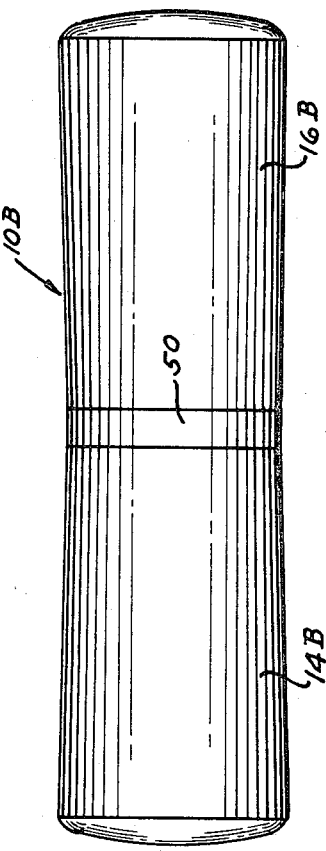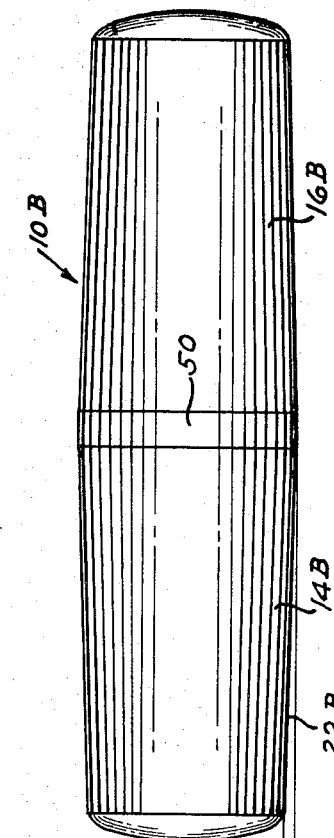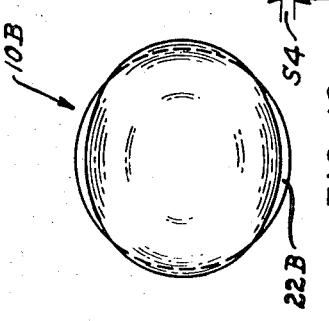

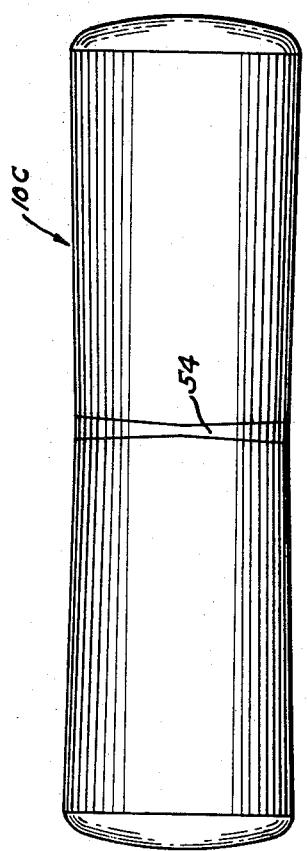
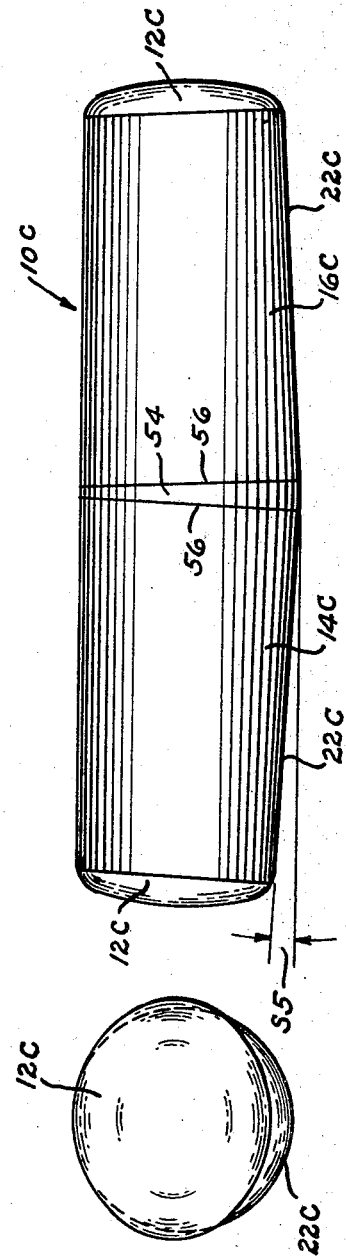
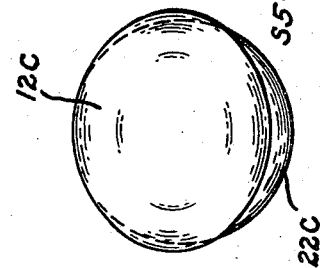

United States Patent Office 3,540,115
Patented Nov. 17, 1970

3,540,115
METHOD OF MAKING A TANK STRUCTURE
Wallace T. Geyer, Des Peres, and Robert W. Randolph, St. Charles, Mo., assignors to ACF Industries, Incorporated, New York, N.Y., a corporation of New Jersey
Filed Jan. 29, 1969, Ser. No. 794,920
Int. Cl. B23p *17/00*
U.S. Cl. 29—421                                                4 Claims

ABSTRACT OF THE DISCLOSURE

An elongate tank structure having a sloping bottom to provide adequate drainage of liquids, and the method of making same. The tank structure comprises elliptical end heads having their major axes extending in a horizontal direction and a circular center portion, with the tank shell changing its shape gradually from the elliptical heads to the circular center and the tank bottom sloping gradually downwardly from the end heads to the center. The tank structure is formed by welding end heads of an elliptical shape to an open ended cylindrical tank shell which has been deformed at its ends to match the elliptical end heads. The enclosed tank structure thus formed is pressurized to an internal pressure exceeding the yield of the material from which the tank shell is formed, while the end heads are held against any deformation. The tank shell is thereby deformed by the internal fluid pressure into a circular center portion with the tank portion between the elliptical end heads and the center having a bottom which slopes gradually downwardly.

BACKGROUND OF THE INVENTION

It is desirable to have tank structures, such as employed in railway tank cars, with a sloping bottom to provide an adequate drainage of liquid from a bottom outlet usually at the center of the tank structure. Sloping bottoms for tank structures, have been provided heretofore in several different manners. For example, conically shaped portions have been provided for drainage purposes. Also, as shown in U.S. Pat. No. 3,282,228, a bottom sump formed from two bottom plates have been secured within bottom openings of cylindrical tank sections to provide a sloping bottom or trough to the center of the tank for discharge.

DESCRIPTION OF INVENTION

The present invention provides an elongate tank structure comprising a pair of ellipsoidal end heads having their major axes extending horizontally, a main body extending between the end heads and having outer ends of an elliptical shape secured to the end heads, the main body having a circular center portion and a bottom sloping downwardly from the end heads at a generally constant and gradual slope to the circular center portion to provide adequate draining of any liquid within the tank to the center of the tank structure for discharge.

The method of the present invention for forming the tank structure comprises forming a generally cylindrical tank shell having open ends, deforming the open ends of the tank shell into an elliptical shape, welding heads of an elliptical shape to the elliptical ends to form the enclosed tank, pressurizing the interior of the tank beyond the yield of the material forming the tank shell to provide a yield or increase in the circumference of the shell at the center thereof of around two percent (2%) while restraining any deformation in the ellipsoidal end heads whereby a tank structure having elliptical ends and a circular center portion is provided and the bottom of the tank structure slopes downwardly from the elliptical ends to the circular center whereby liquids may easily drain from a bottom discharge outlet at the center of the tank structure.

The tank structure is preferably employed with a railway tank car for the transit of liquids and effects a drainage of practically all the liquid content within the tank car. The method employed is inexpensive and simple in operation.

The invention accordingly comprises the constructions hereinafter described, the scope of the invention being indicated in the following claims.

In the accompanying drawings, in which several of various possible embodiments of the invention are illustrated, FIG. 1 is a side elevation of one embodiment of the tank structure forming the present invention having a bottom sloping downwardly from the ends thereof to the center of the tank;

FIG. 2 is a top plan of the tank structure shown in FIG. 1;

FIG. 3 is an end elevation of the tank structure shown in FIGS. 1 and 2;

FIG. 9 is a side elevation illustrating the tank structure of FIGS. 1–6 mounted on a railway tank car for the transport of liquids and the like;

FIG. 10 is a side elevation of a separate modification of the present invention in which a center cylindrical ring is provided and adjacent tank shell portions are welded thereto;

FIG. 11 is a top plan of the tank structure shown in FIG. 10;

FIG. 12 is an end elevation of a tank structure shown in FIGS. 10 and 11;

FIG. 13 is a side elevation of another embodiment of the present invention in which a tapered center ring is provided to provide a flat top or upper surface in the completed tank structure;

FIG. 14 is a top plan of the tank structure shown in FIG. 13; and

FIG. 15 is an end elevation of the tank structure shown in FIGS. 13 and 14.

Corresponding reference characters indicate corresponding parts throughout the drawings of this invention.

Figure 4:
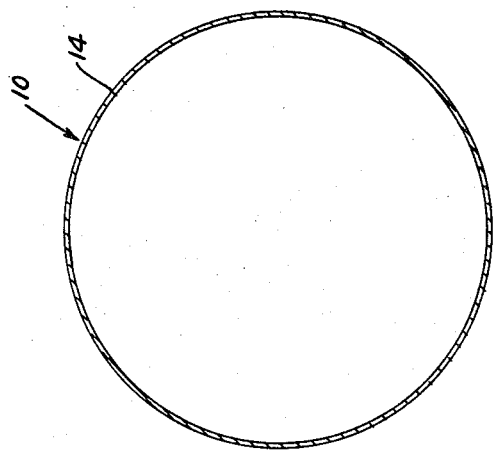
FIG. 4 is a section taken generally along line 4—4 of FIG. 1.

Referring to the drawings and more particularly to the embodiment shown in FIGS. 1–6, a tank structure comprising the present invention is generally indicated 10 and includes end heads 12 of an ellipsoidal shape having a major axis X extending horizontally and a minor axis Y extending vertically as shown particularly in FIG. 3. Tank portions 14 and 16 are welded at weld seams 18 to ellipsoidal heads 12 and are welded to each other along weld seam 20 which forms the center of tank structure 10. The center portion is circular as shown in FIG. 4 with the inner ends of tank portions 14 and 16 being of a circular shape.

Figure 5:
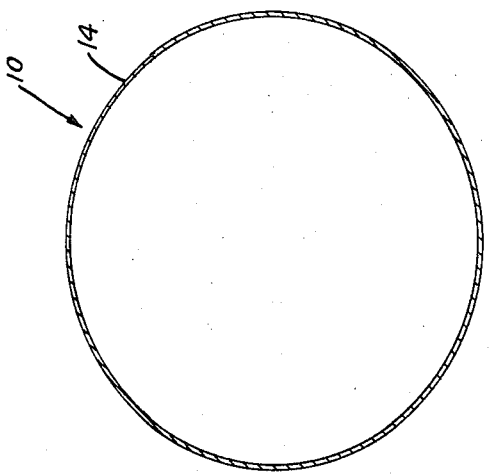
FIG. 5 is a section taken generally along line 5—5 of FIG. 1.
Figure 6:
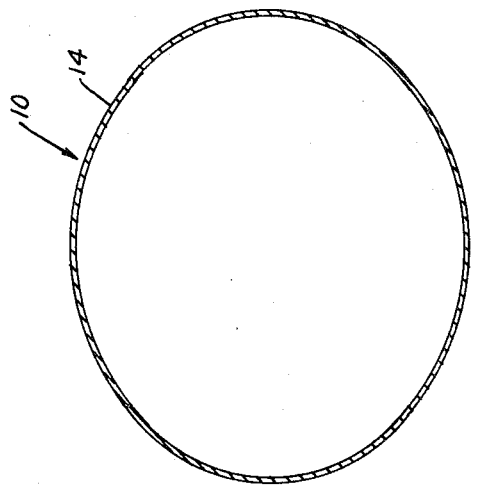
FIG. 6 is a section taken generally along line 6—6 of FIG. 1.

The outer end of each tank portion 14 and 16 is of the same shape as end head 12 and is illustrated in FIG. 6. The shape of tank portions 14 and 16 gradually changes from the elliptical shape shown in FIG. 6 to the circular shape shown in FIG. 4 and the tank portions 14 and 16 between the center portion of the car and the ends of tank structure 12 are non-circular, such as illustrated in FIG. 5. As the minor axes of ellipsoidal heads 12 extend in a vertical direction, a slope bottom indicated 22 in FIG. 1 is provided sloping downwardly from end heads 12 to the center of the tank structure 10. A slope S of around ¼ inch per foot of tank structure 10 is provided to provide a total slope, for example, in a tank structure 10 having a length of around sixty (60) feet, of around six (6) inches. The arrangement of bottom slope S permits an adequate drainage of liquids from the ends 12 to the center of tank structure 10.

The top or upper surface of tank structure 10 is indicated at 24 for tank portions 14 and 16 and has a slope indicated at S1 equal to slope S of bottom 22. Referring to FIG. 2, an inward slope S2 along the sides of tank structure 10 is obtained as the major axes of ellipsoidal heads 12 extend horizontally. Slope S2 is equal to slopes S and S1. Normally, the critical diameter for AAR (Association of American Railroads) clearance limits in railway tank cars is at the center of the car. Thus, the major axes of the ellipsoidal heads 12 may be greater than the diameter of the circular end heads conventionally employed in tank structures of railway tank cars. This compensates for the somewhat smaller minor axes of ellipsoidal heads 12.

Figure 7:
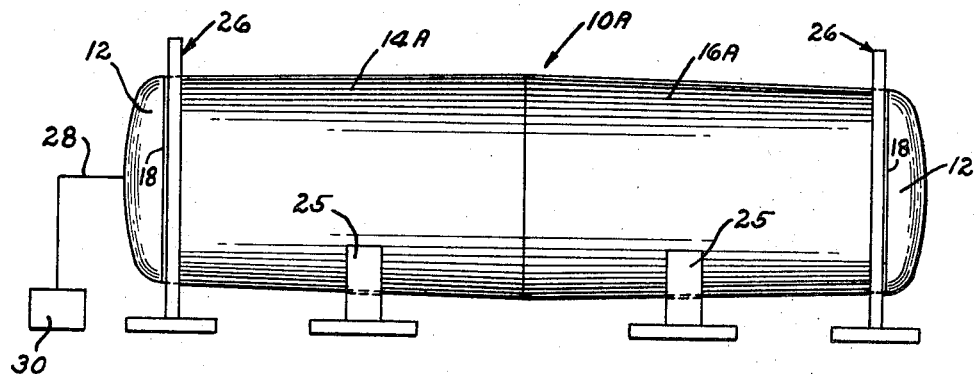
FIG. 7 is a side elevation showing the tank structure of FIGS. 1–6 being formed by pressurizing the interior of the tank structure.
Figure 8:
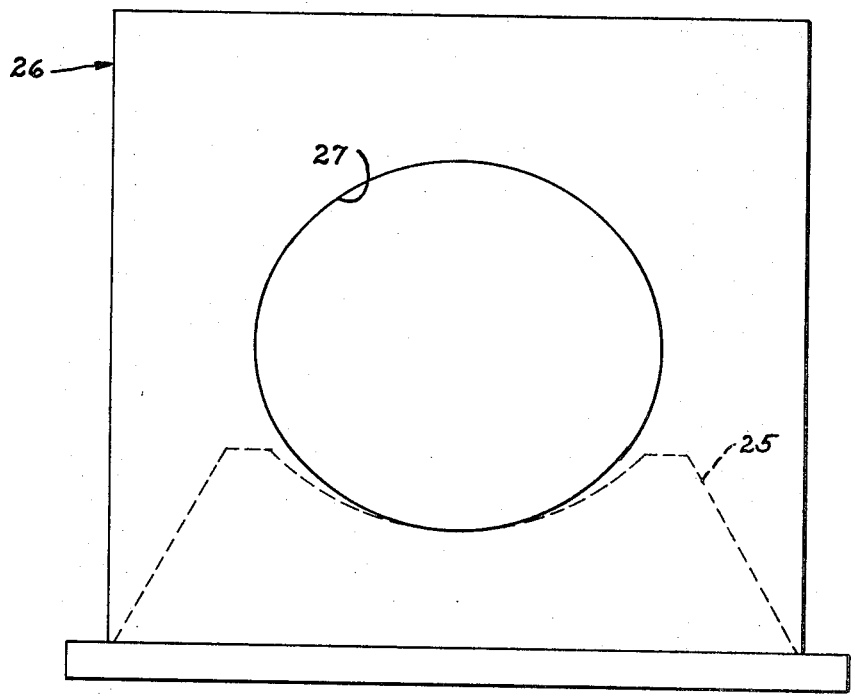
FIG. 8 is an end elevation of the tank structure of FIG. 7 illustrating means to restrain the deforming of the ellipsoidal end heads upon pressurizing of the interior of the tank structure.

Referring to FIGS. 7 and 8, a novel method for forming the tank structure shown in FIGS. 1–6 is illustrated. First, the ellipsoidal heads 12 are formed by pressing in the conventional manner. Then, preformed tank portions 14A and 16A are initially formed by rolling and welding sheets into a cylindrical tank shell portion having open outer ends. The circumference of the preformed tank shell portions 14A and 16A is made equal to the circumference of the pressed elliptical heads 12. Then, preformed tank shell portions 14A and 16A are deformed to match the elliptical shape of end heads 12 and the heads 12 are welded in place along weld seams 18 to provide a tank of an elliptical cross section since, at this stage of fabrication, the center of the tank structure is at least of a partial elliptical shape resulting from the deforming of the outer ends to match the ellipsoidal heads. The tank structure thus formed is then placed on intermediate support cradles 25. Then, an end restraining ring 26 having an inner opening 27 therein and conforming in shape to the shape of end heads 12 is positioned over each end of tank structure 10A as shown in FIG. 7. Then, an opening is cut in one of the end heads 12 and a water line 28 is connected to the opening. A suitable hydraulic pump 30 supplies water to the interior of the preformed tank structure 10A to pressurize tank structure 10A.

As a specific, but non-limiting example, a tank structure 10A is provided having a length of sixty (60) feet and a capacity of around 24,000 gallons while being adapted particularly for use with a railway tank car. Structure 10A is formed of carbon steel having a thickness of ½ inch and a circumference of around three hundred and forty (340) inches which is equal to the circumference of end heads 12. An internal fluid pressure of around 300 p.s.i. (pounds per square inch) is provided by pump 30 and results in around a two percent (2%) yield or increase in the circumference of tank structure 10A at its center, or a total increase in circumference of around six inches thereby resulting in a circular or substantially circular center. The outer ends of tank structure 10A adjacent end heads 12 do not deform as end heads 12 and end rings 26 prevent any yielding of the ends of tank structure 12A thereat. The increase in the circumference of tank structure 10A between the center and the ends is proportional to the length. For example, the yield or increase in circumference of one fourth (¼) of the length of the tank structure would be around one percent (1%). With the diameter of the center of the completed tank structure 10A after being yielded being around one hundred and ten (110) inches, the major axis of end heads 12 would be around one hundred and twenty-two (122) inches and the minor axis would be around ninety-eight (98) inches. Therefore, the total capacity of tank structure 10A would be substantially the same as a cylindrical tank structure having a uniform diameter of one hundred and ten (110) inches. The shape of structures 14A and 16A along its length changes gradually from an elliptical shape at its outer end to a circular shape at its inner end adjacent the center of tank structure 10A and results in a total slope S of around six (6) inches.

While the increase in circumference or yield at the center of the tank structure in the above example was around two percent (2%), yields between around one-half percent (½%) and six percent (6%) would function adequately, the specific yield depending on the total diameter of the tank structure and the type of material employed in the construction of the tank structure. The fluid pressure to provide a yield in the tank structure is dependent on the thickness of the material and the specific material employed. For thicknesses of a majority of the steels between around ¼ inch and ⅞ inch, an internal minimum fluid pressure of between one hundred and fifty (150) p.s.i. and four hundred and fifty (450) p.s.i. would function adequately, the specific pressure dependent on the thickness and type of material employed.

Tank structure 10A thus formed is preferably employed as a railway tank car generally indicated at 36 in FIG. 9. Suitable fixtures such as a bottom discharge outlet valve 38 adapted for the unloading of liquid lading is secured by cutting a suitable opening in tank structure 10A. A suitable upper valve 40 is provided for the loading of liquid within tank shell 10A. Shell 10A is mounted on cradle structures 42 which form part of an underframe including center sill 44. The underframe is mounted on wheeled trucks 46 adapted for travel along a railway track. Liquid lading will easily drain from the ends of railway tank car 36 to bottom discharge valve 38 adjacent the center of the car for discharge.

Referring to FIGS. 10–12, another embodiment of the invention is illustrated in which a cylindrical center ring 50 is provided between tank portions 14B and 16B. Cylindrical ring 50 may be between around one to four feet in length and is of generally the same thickness as the tank portions 14B and 16B. The tank structure 10B is formed in a manner similar to the embodiment shown in FIGS. 1–9 and provides a slope bottom 22B having a slope S4 equal to slope S in the embodiment of FIGS. 1–9.

Referring now to FIGS. 13–15, a further modified tank structure 10C is illustrated in which a tapered center ring 54 is provided. Ring 54 has a taper of an amount sufficient to provide a flat horizontal top in tank structure 10C. End heads 12C are ellipsoidal with the major axes thereof extending in a horizontal direction. A slope bottom 22C is provided which has a slope S5 double or twice the slope in the embodiment shown in FIGS. 1–6. The tank structure of FIGS. 13–15 is formed in a manner similarly to that of the tank structure of FIGS. 1–9 with tapered ring 54 being of substantially the same thickness as tank portions 14C and 16C and welded thereto along weld seams 56. Thus, bottom 22C slopes downwardly from end heads 12C to center ring 54 for the discharge of liquid lading and provides a highly effective drainage.

From the foregoing, it will be understood that a novel tank structure and method of forming same have been provided employing ellipsoidal heads and a circular center with the intermediate portions of the tank structure gradually changing from an elliptical shape to a circular shape. The tank structure is easily formed from cylindrical tank portions by the employment of internal fluid pressure and provides a slope bottom which may be formed in a minimum of time by the internal pressure. This eliminates the necessity for forming truncated conical sections or other types of odd shaped sections in order to have a slope bottom tank.

In view of the above, it will be seen that the several objects of the invention are achieved and other advantageous results obtained.

What is claimed is:

1. A method of forming an elongate tank structure having a bottom sloping downwardly from its ends to the center thereof to provide adequate drainage of liquid from the ends to the center comprising, forming a generally cylindrical tank shell having open ends, deforming the open ends of the tank shell into an elliptical shape, welding heads of an elliptical shape to said elliptical ends to form the enclosed tank, pressurizing the interior of the tank beyond the yield of the material forming the tank shell to provide an increase in the circumference of the center portion of the tank structure, and restraining any deformation in the end heads whereby a tank structure having elliptical ends and a circular center is provided and the bottom of the tank structure slopes gradually downwardly from the elliptical ends to the circular center when the longitudinal axis of the tank structure is on a generally horizontal plane.

2. A method of forming an elongate tank structure having a bottom sloping downwardly from its ends to the center thereof to provide adequate drainage of liquid from the ends to the center comprising, forming a generally cylindrical tank shell, deforming the ends of the tank shell to provide elliptical ends, welding heads of an elliptical shape to the elliptical ends to form the enclosed tank, pressurizing the interior of the tank to an internal fluid pressure of over around one hundred and fifty p.s.i. beyond the yield of the steel material forming the tank shell to provide an increase in circumference of the center portion of the tank structure, restraining deformation in the end heads upon pressurizing of the interior of the tank whereby a tank structure having elliptical ends and a generally circular center portion is provided and the bottom of the tank structure slopes gradually downwardly from the elliptical ends to the circular center when the longitudinal axis of the tank structure is on a generally horizontal plane.

3. A method of forming a railway tank car having a bottom sloping downwardly from its ends to the center thereof to provide adequate drainage of liquid from the ends to the center comprising, forming a generally cylindrical tank shell, deforming the ends of the tank shell to provide elliptical ends, welding heads of an elliptical shape to the elliptical ends to form the enclosed tank, pressurizing the interior of the tank shell beyond the yield of the material forming the tank shell, to provide a yield of at least one-half percent (½%) at the center portion of the tank shell thereby to increase the circumference of the tank shell at said center portion, restraining any deformation in the end heads upon pressurizing the interior of the tank whereby a tank structure having elliptical ends and a circular center is provided and the bottom of the tank structure slopes gradually downwardly from the elliptical ends to the circular center when the longitudinal axis of the tank structure is on a generally horizontal plane, securing an underframe to the tank structure, and mounting the underframe on a pair of wheeled trucks to provide a railway tank car having a sloping bottom.

4. A method of forming a railway tank car having a bottom sloping downwardly from its ends to the center thereof to provide adequate drainage of liquid from the ends to the center comprising, forming a generally cylindrical tank shell from a steel material having a thickness between around ¼ inch and ⅞ inch, deforming the ends of the tank shell to provide elliptical ends, welding heads of an elliptical shape to the elliptical ends to form the enclosed tank, pressurizing the interior of the tank shell to a pressure of around at least one hundred and fifty p.s.i. and beyond the yield of the material forming the tank shell to provide a yield in such material of at least around one-half percent (½%) thereby to increase the circumference of the tank shell at the center portion, restraining any deformation in the end heads upon pressurizing the interior of the tank whereby a tank structure having elliptical ends and a circular center is provided and the bottom of the tank structure slopes gradually downwardly from the elliptical ends to the circular center when the longitudinal axis of the tank structure is on a generally horizontal plane, securing an underframe to the tank structure, and mounting the underframe on a pair of wheeled trucks to provide a railway tank car having a sloping bottom.

References Cited
UNITED STATES PATENTS

| | | | |
|---|---|---|---|
| 2,086,134 | 7/1937 | Ludwick | 29—421 X |
| 2,102,124 | 12/1937 | Lithgow | 220—1 |
| 2,362,657 | 11/1944 | Meyer | 29—475 X |
| 2,503,190 | 4/1950 | Branson | 29—407 |
| 2,678,620 | 5/1954 | Cote | 113—120 X |
| 2,954,604 | 10/1960 | Ramey | 29—421 |
| 3,379,478 | 4/1968 | Aller et al. | 105—358 X |
| 3,479,724 | 11/1969 | Kruizenga et al. | 105—358 X |

JOHN F. CAMPBELL, Primary Examiner

A. D. PALMA, Assistant Examiner

U.S. Cl. X.R.

29—480; 113—120; 105—360